July 15, 1958 — C. E. HURLBURT — 2,842,968
VERTICAL GYROSCOPE ERECTION SYSTEM
Filed Sept. 26, 1955 — 2 Sheets-Sheet 1

INVENTOR.
CHARLES E. HURLBURT
BY
*Nicholas J. Garofalo*
ATTORNEY

United States Patent Office 2,842,968
Patented July 15, 1958

2,842,968

VERTICAL GYROSCOPE ERECTION SYSTEM

Charles E. Hurlburt, River Edge, N. J., assignor to Bendix Aviation Corporation, Teterboro, N. J., a corporation of Delaware Application September 26, 1955, Serial No. 536,609

1 Claim. (Cl. 74—5.44)

This invention concerns new and useful improvements in vertical gyroscopes; and it has for its general object the provision of a novel and practical erection system for such gyroscopes. The invention finds practical application in vertical gyroscopes commonly used in aircraft for various functions requiring accurate vertical information, such as the gyro horizon instrument.

A further object of the invention is to provide a vertical gyroscope erection system of simple and efficient construction for eliminating errors commonly arising in such instruments during turning maneuvers of the aircraft in which they are mounted.

A feature of the invention is certain switch controlled weight shifting solenoids designed to effect erection of the gyro to vertical when required upon displacement of the gyro in pitch or roll directions.

A further feature of the invention is a particular arrangement of the erection system to effect maintenance of the vertical direction of the gyro during turn maneuvers of the aircraft.

The invention further lies in the particular structure of its component parts, and also in their general organization and cooperative association to effect the various purposes and advantages intended.

The foregoing and other objects and advantages of this invention will appear more fully hereinafter from a consideration of the detailed description which follows, taken together with the accompanying drawings wherein an embodiment of the invention is illustrated. It is to be expressly understood, however, that the drawings are for purposes of illustration and description and are not to be construed as defining the limits of the invention.

Figure 1:
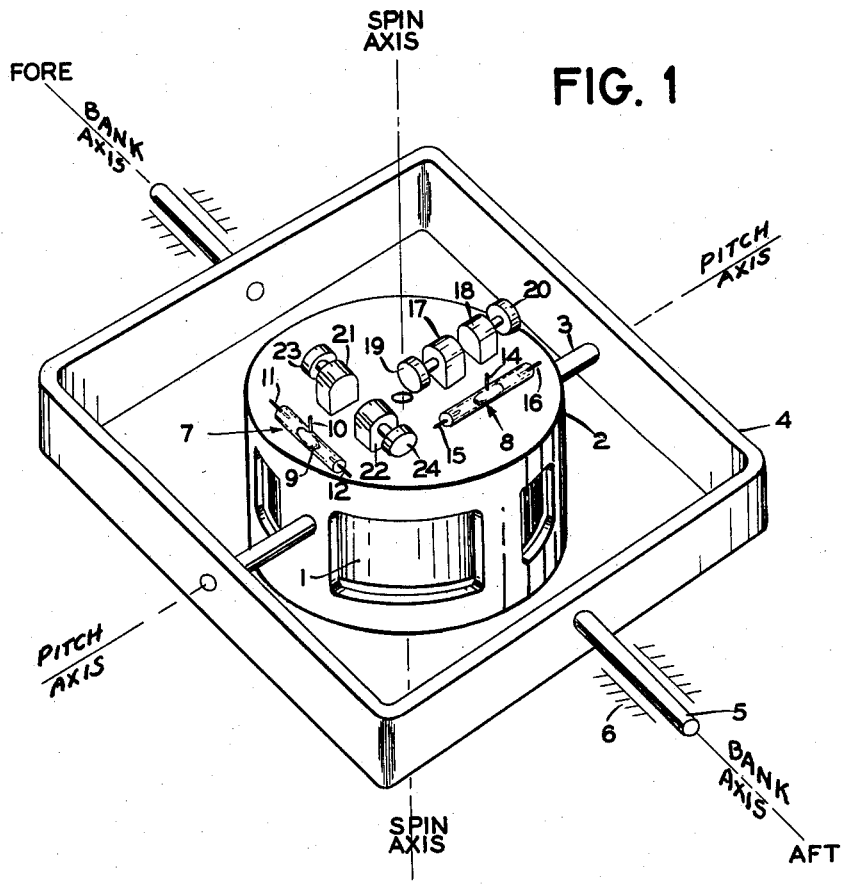
Fig. 1 is a schematic showing of a conventional vertical gyroscope of the horizon indicating type to which the improvements of the present invention have been added.
Figure 2:
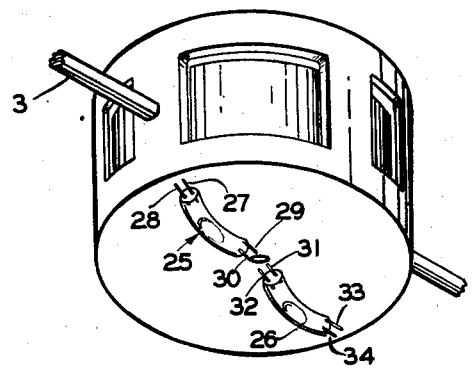
Fig. 2 is a bottom end view of Fig. 1.
Figure 3:
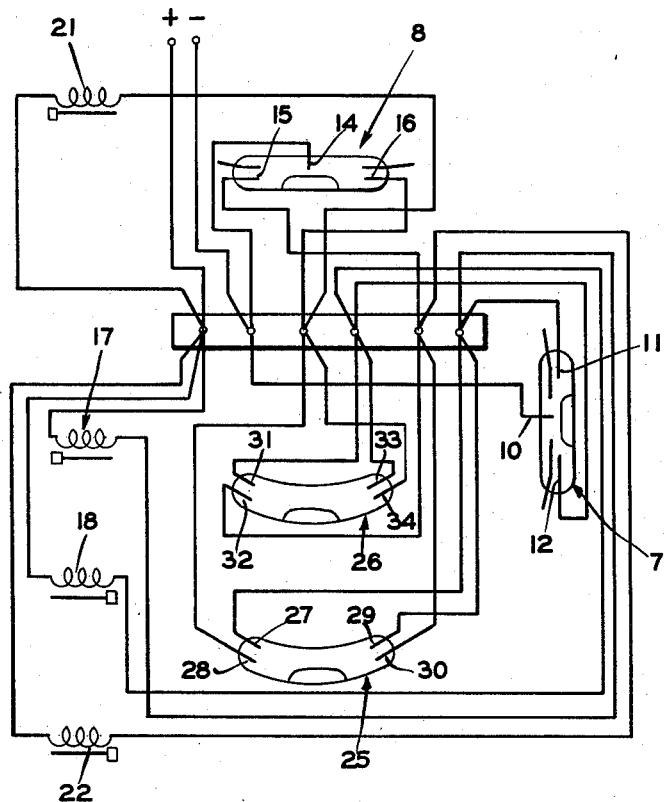
Fig. 3 is a diagram of the solenoid control circuit.

In the drawings is shown a conventional non-pendulous gyro 1 having a vertical spin axis in a gimbal 2, a pitch axis defined by trunions 3 journaled in an outer gimbal 4, and a bank or roll axis defined by trunions 5 suitably journaled in a housing support 6. The latter is adapted to be mounted in conventional manner in an aircraft, the roll axis having a fore and aft direction relative to the aircraft.

Separate mercury thallium level switches 7, 8 are mounted to inner gimbal 2, respectively across the pitch and bank axes of the gyro.

Switch 7 comprises a cylindrical envelope containing a blob 9 of mercury thallium, and having a center contact 10 and opposed end contacts 11, 12. Switch 8 is similarly formed, the center contact being designated 14, the end contacts, respectively, 15 and 16.

Switch 7 serves to detect pitching of the gyro, and controls the energization of one or the other, as required, of a pair of solenoids 17, 18 to effect erection of the gyro from a tilted direction. Solenoids 17, 18 are mounted atop the inner gimbal in parallel relation to the pitch axis. The solenoids respectively include weighted plungers 19, 20, designed to shift in opposite directions to effect a torque upon the gyro, as may be required to precess it to vertical.

Switch 8 serves to detect rolling of the gyro, and controls the energization of one or the other, as required, of a pair of solenoids 21, 22 to effect erection of the gyro from its tilted direction. Solenoids 21, 22 are mounted atop the inner gimbal in parallel relation to the bank axis. These solenoids, likewise respectively include weighted plungers 23, 24 designed to shift in opposite directions to effect a torque upon the gyro, as may be required to precess it to vertical.

A pair of auxiliary switches 25, 26 controlling the operation of solenoids 21 and 22 are mounted to the bottom end of the inner gimbal in parallel relation to the pitch axis. Switches 25, 26 each comprise an upwardly facing curved envelope in which is contained a blob of mercury thallium. Switch 25 carries open contacts 27, 28 in one end and open contacts 29, 30 in the opposite end; while switch 26 carries open contacts 31, 32 in one end and open contacts 33, 34 in the other. The pairs of end contacts in the respective switches are closable accordingly as the mercury blob therein is moved to one end or the other of the envelope. Switches 25 and 26 operate in conjunction with switch 7 to effect the operation of solenoids 21 and 22 during turn maneuvers of the craft, solenoid 21 being energized under certain conditions and solenoid 22 under other conditions.

The gyro is understood to rotate by conventional means within its gimbal. When none of the solenoids is energized, the unit is non-pendulous and the gyro has a fixed vertical direction in space.

In the operation of the erection system, if the gyro spin axis were to depart from vertical in such manner that the top of the spin axis tilts to the fore, the blob in switch 7 closes contacts 10, 11 to establish a circuit energizing solenoid 17. Shifting of the solenoid plunger 19 with its mass creates a torque effective to precess the gyro to vertical. This torque action continues until the spin axis reaches vertical at which time switch 7 is leveled and contacts 10, 11 open to de-energize the solenoid and to return the plunger.

In like manner, if the top of spin axis tilts aft on its pitch axis, contacts 10, 12 close in switch 7 to energize solenoid 18. The torque resulting from shifting of plunger 20 erects the gyro to vertical, and the switch and solenoid restore to normal.

Switch 8 operates upon tilting of the gyro to the left or right on its bank axis, and energizes either solenoid 21 or 22 as required to effect an erecting torque action on the gyro. When the top of the gyro tilts to the left, contacts 14, 15 in switch 8 close to energize solenoid 22. Shifting of the plunger mass effects erection of the gyro and consequent leveling of the switch and restoration of the contacts and plunger mass to normal. Solenoid 21 is energized upon closing of contacts 14 and 16 following tilting of the top of the gyro to the right.

It is to be noted that switches 7 and 8 are constructed with such a quantity of mercury thallium that when the angle between true and dynamic vertical exceeds a predetermined value, the mercury thallium is all in one end or the other of the switch and the center terminals of the respective switches become uncovered, whereby the switches are ineffective to control the related torquing solenoids. This action will take place in the pitch detection switch 7 on fore and aft accelerations during take-offs and landings. However, at these times use of the pitch detector switch is not desirable, especially in the case of take-offs in high speed planes, because of the short duration of such accelerations. During turns, the bank detection switch is not usable as an accurate reference as it may become automatically disabled upon movement of the blob as above.

In turning actions, provision is made to control the bank erection solenoids through the pitch detecting mechanism switch 7 and by means of the auxiliary switches 25 and 26. In a right turn, switch 25 connects terminals 27, 28, and switch 26 connects terminals 31, 32; in a left turn, the terminals at the opposite ends of the switches are connected.

In the operation of the erection system during turns, if the top of the spin axis attempts in a right turn to wander to the right, the forces acting on the gyro during the turn cause movement of the blob in the pitch detection switch to close over contacts 10 and 11, and causes a shift of the blob in switches 25 and 26 to respectively close contacts 27, 28 and 31, 32. Whereupon, solenoids 17 and 21 are energized, solenoid 21 being energized through contacts 27, 28, and contacts 10, 11. The directional shift of the plunger masses of the latter solenoids act to precess the gyro to vertical. Should the wandering of the gyro in a right turn be to the left, contacts 10 and 12 close in switch 7 and contacts 27, 28 and 31, 32 close respectively in switches 25 and 26 to energize solenoids 18 and 22; solenoid 22 being energized through contacts 31, 32 in switch 26 and contacts 10 and 12 in switch 7. The torque created by the shifted plungers of the energized solenoids precesses the gyro to vertical.

In a left turn, where the top of the gyro attempts to wander to the right, detection will be made by the pitch detection switch 7 and by auxiliary switches 25, 26. Solenoids 18 and 21 become energized to effect by shifting of their plunger weights erection of the gyro. Solenoid 21 being energized through closing of contacts 33, 34 in switch 25, and contacts 10, 12 in switch 7. Should be wandering of the gyro to be the left in a left turn, solenoids 17 and 22 become energized; solenoid 22 becoming energized through closing of contacts 10 and 11 in switch 7 and contacts 29, 30 in switch 25.

The various actuated solenoids and switches restore to normal as the gyro attains its vertical direction.

While the invention has been shown and illustrated as above, it is to be expressly understood that the invention is not limited thereto. Various changes can be made in the design and arrangement of the parts without departing from the spirit and scope of the invention as the same will now be understood by those skilled in the art.

What is claimed is:

In a vertical gyro erection system, the combination of a vertical gyro having freedom in an inner gimbal on a pitch axis and freedom in an outer gimbal on a roll axis, said inner gimbal having a pair of opposite supporting surfaces, a mercury-type switch mounted on one of said supporting surfaces of the inner gimbal in parallel relation to the roll axis for sensing departure of the gyro on its pitch axis, a similar type switch mounted on said one surface of the inner gimbal in parallel relation to the pitch axis for sensing departure of the gyro on its roll axis, a pair of solenoids mounted on said one supporting surface of the inner gimbal and normal to the pitch axis, each having a plunger mass shiftable on energization of the solenoid in a direction opposed to the other, a second pair of solenoids mounted on said one supporting surface of the inner gimbal and normal to the roll axis, each having a plunger mass shiftable on energization of the solenoid in a direction opposed to the other, one or the other of a pair of the solenoids being energizable by one of the switches accordingly as the gyro departs in one direction or the other on its pitch axis, one or the other of the other pair of solenoids being energizable by the other of the switches accordingly as the gyro departs in one direction or the other on its roll axis, the switch mounted in parallel relation to the pitch axis being characterized by a cylindrical tubular envelope having a center contact, opposed end contacts and a blob of mercury fluid movable in response to precession of the gyro on its roll axis to close over the center contact and one of the end contacts, and the blob of mercury fluid characterized as of such size as to be responsive to centrifugal force created during rotation of the outer gimbal about its vertical axis to move to an end of the envelope free of the center contact whereby the roll sensing switch is ineffective to sense precession of the gyro on its roll axis during such rotation of the outer gimbal, a pair of auxiliary mercury switches mounted on the other of the pair of supporting surfaces of the inner gimbal in parallel relation to the roll sensing switch and cooperable during such rotation of the outer gimbal with the pitch sensing switch to close a circuit to the solenoids normally controlled by the roll sensing switch.

References Cited in the file of this patent
UNITED STATES PATENTS

| | | |
|---|---|---|
| 2,368,644 | Curry | Feb. 6, 1945 |
| 2,417,573 | Strother | Mar. 18, 1947 |
| 2,434,488 | Dolude | Jan. 13, 1948 |

FOREIGN PATENTS

| | | |
|---|---|---|
| 720,220 | Great Britain | Dec. 15, 1954 |